(No Model.)

D. J. DAVIS.
MILK PAN COVER.

No. 251,420. Patented Dec. 27, 1881.

Witnesses
W. C. Corliss
Gertrude Edgerton

Inventor
Daniel J. Davis
By Coburn & Thacher
Attorneys

UNITED STATES PATENT OFFICE.

DANIEL J. DAVIS, OF CHICAGO, ILLINOIS.

MILK-PAN COVER.

SPECIFICATION forming part of Letters Patent No. 251,420, dated December 27, 1881.

Application filed September 16, 1881. (No model.)

*To all whom it may concern:*

Be it known that I, DANIEL J. DAVIS, a citizen of the United States, residing at Chicago, in the county of Cook, in the State of Illinois, have invented certain new and useful Improvements in Milk-Pan Covers, which are fully set forth in the following specification, reference being had to the accompanying drawings, in which—

Figure 1:
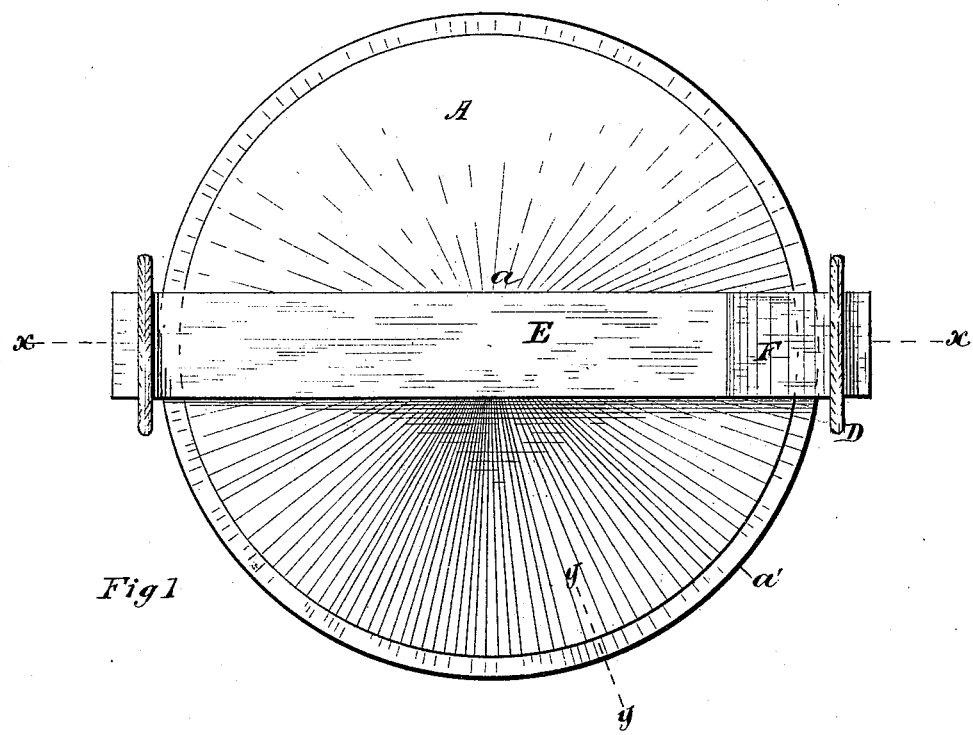
Figure 2:
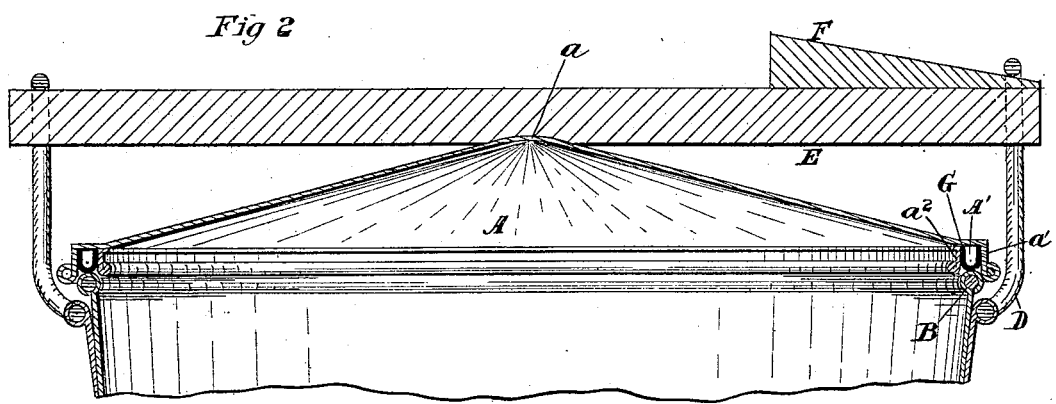
Figure 3:
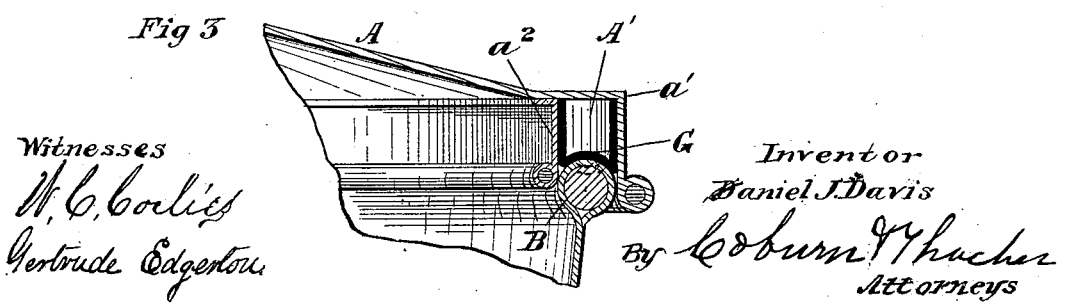

Figure 1 is a plan view of my improved cover in position. Fig. 2 is a section on the line $xx$ in Fig. 1, the cover being represented as set loosely on the pan. Fig. 3 is an enlarged partial section on the line $yy$ in Fig. 1, representing the cover as set close on the pan.

The same letters denote the same parts in all the figures.

My invention relates to vessels for containing milk, and for analogous purposes; and it consists in the several devices and combinations of devices which will be fully set forth hereinafter, and definitely pointed out in the claims, the object of the whole being to set the cover close upon the vessel by means at once more certain, durable, and economical than those now in use.

In the drawings, A denotes the cover of a milk-pan or other vessel. It is made preferably rising toward the center $a$, either in the conical form shown in the drawings or in a segment of a sphere. This cover is provided on its lower margin with a surrounding groove, A', which, as shown in the drawings, is formed by turning down the edge of the cover to form the flange $a'$ and soldering to the lower side of the cover the parallel flange $a^2$; but it may be formed in any way that may be found convenient. The cover (apart from the strip $a^2$) may advantageously be stamped out of a single piece of metal. The groove is just wide enough to admit without difficulty the upper edge, B, of the vessel. In the groove is placed a circular gasket, G, of india-rubber or other suitable material, wide enough to remain in the groove without danger of dropping out and thick enough to fill the groove nearly or quite its whole depth, so as to sit close on the edge of the vessel when the cover is forced down; or the gasket, instead of being solid, may be, as shown in the drawings, a strip bent into a trough-like or semi-cylindroidal form, and set in the groove with its convexity downward. The gasket is not fastened in, but is held in place by its own elasticity only. On the sides of the vessel, and diametrically opposite each other, are set ears or loops D, rising some distance above the top of the cover when the latter is set on the vessel. These may be of any usual construction, preferably with horizontal tops. When the cover is set on the vessel a bar, E, preferably of wood and hollowed slightly in the middle, so as to fit on the apex or central convexity of the cover, is placed on the cover, its ends passing through the ears D. A wedge, F, is then driven into one of the ears above the bar, and the cover is thus pressed down on the vessel, so that the edge of the latter enters a considerable distance into the groove A', compressing the gasket G, as shown in Fig. 3. An air-tight joint is thus formed between the vessel and its cover, the latter not being at all liable to come off, and the bar E forming a convenient handle by which the vessel may be lifted.

The cover which I have described is extremely economical, no waste of metal being involved in the making of it. The bar and wedge also constitute a fastening quite as secure as the screw-clamps heretofore employed and very much cheaper. The gasket, not being fastened in the groove, can be taken out as often as desired for the purpose of scalding the cover, and when worn out can readily be replaced.

The groove A' might be formed on the upper edge of the vessel, instead of on the cover, without affecting the principle of my invention; but the construction which I have shown is obviously preferable.

What I claim as my invention, and desire to secure by Letters Patent, is—

1. A vessel provided with ears rising above its upper margin and arranged opposite each other, in combination with a cover, a bar of suitable length and thickness to rest on the cover, its ends passing through the ears, and a wedge adapted to enter one ear above the bar, substantially as and for the purpose described.

2. In combination with a vessel having ears D, arranged as described, the conical or arched cover A, the bar E, hollowed on its under surface to fit the cover, and the wedge F, substantially as and for the purpose described.

3. A vessel having ears D, arranged as described, a cover provided on its under side with a groove arranged to inclose the rim of the vessel, a gasket detachably set in the groove, a bar of suitable length and thickness to rest on the cover and project into the ears, and a wedge adapted to enter one ear above the bar, all in combination, substantially as and for the purpose described.

DANIEL J. DAVIS.

Witnesses:
GEO. R. CUTLER,
JNO. C. MACGREGOR.